(12) United States Patent
Kai et al.

(10) Patent No.: US 8,537,070 B2
(45) Date of Patent: Sep. 17, 2013

(54) ANTENNA SHEET, TAG, AND METHOD OF MANUFACTURING TAG

(75) Inventors: Manabu Kai, Kawasaki (JP); Teruhisa Ninomiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 378 days.

(21) Appl. No.: 13/079,184

(22) Filed: Apr. 4, 2011

(65) Prior Publication Data

US 2012/0013469 A1    Jan. 19, 2012

(30) Foreign Application Priority Data

Jul. 16, 2010   (JP) ................................ 2010-162205

(51) Int. Cl.
*H01Q 9/28* (2006.01)
*H01Q 13/10* (2006.01)

(52) U.S. Cl.
USPC ........................... 343/803; 343/804; 343/770

(58) Field of Classification Search
USPC .................. 343/795, 803, 804, 810, 767, 770
See application file for complete search history.

(56) References Cited

U.S. PATENT DOCUMENTS

| | | | |
|---|---|---|---|
| 7,175,586 B2 | 2/2007 | Mattila et al. | |
| 7,342,498 B2 | 3/2008 | Baba et al. | |
| 7,714,794 B2 * | 5/2010 | Tavassoli Hozouri | 343/795 |
| 7,896,796 B2 | 3/2011 | Mattila et al. | |
| 7,916,032 B2 | 3/2011 | Baba et al. | |
| 2005/0092845 A1 | 5/2005 | Forster | |
| 2006/0032926 A1 | 2/2006 | Baba et al. | |
| 2006/0211560 A1 | 9/2006 | Mattila et al. | |
| 2007/0126228 A1 | 6/2007 | Mattila et al. | |
| 2008/0122630 A1 | 5/2008 | Baba et al. | |
| 2008/0227614 A1 | 9/2008 | Mattila et al. | |
| 2009/0096696 A1* | 4/2009 | Joyce et al. | 343/793 |
| 2010/0164726 A1* | 7/2010 | Tada | 340/572.7 |

FOREIGN PATENT DOCUMENTS

| | | |
|---|---|---|
| CN | 1734478 | 2/2006 |
| CN | 101184684 | 5/2008 |
| DE | 196 43 912 | 5/1998 |
| EP | 1 626 364 | 2/2006 |
| EP | 1 830 303 | 9/2007 |
| EP | 2 182 472 | 5/2010 |
| JP | 2006-53833 | 2/2006 |

OTHER PUBLICATIONS

Partial European Search Report dated Nov. 2, 2011, from corresponding European Application No. 11 16 1849.
European Search Report dated Feb. 21, 2012, from corresponding European Application No. 11 16 1849.
Chinese First Office Action dated Jun. 6, 2013, from corresponding Chinese Application No. 201110110485.6.

\* cited by examiner

*Primary Examiner* — Hoang V Nguyen
(74) *Attorney, Agent, or Firm* — Katten Muchin Rosenman LLP

(57) ABSTRACT

An antenna sheet includes a mounting section on which an integrated circuit (IC) chip electrically connected with an antenna pattern is mounted, a first loop forming section that extends from both ends of the mounting section that holds the IC chip therebetween and forms a first loop, an intersection portion in which at least parts of both forefronts of the first loop forming section intersect with each other, and a second loop forming section that extends from the forefronts of the first loop forming section that intersect in the intersection portion and forms a second loop outside the first loop.

12 Claims, 15 Drawing Sheets

US 8,537,070 B2

ANTENNA SHEET, TAG, AND METHOD OF MANUFACTURING TAG

CROSS-REFERENCE TO RELATED APPLICATION

This application is based upon and claims the benefit of priority of the prior Japanese Patent Application No. 2010-162205, filed on Jul. 16, 2010, the entire contents of which are incorporated herein by reference.

FIELD

The embodiments discussed herein are directed to an antenna sheet, a tag, and a method of manufacturing a tag.

BACKGROUND

In recent years, there has been used a radio frequency identification (RFID) tag such as a contactless integrated circuit (IC) card that is supplied with a power supply and receives information from an external device such as a reader/writer by using a radio wave in a non-contact manner. The RFID tag includes a transmission/reception antenna pattern formed on a base material such as plastic and an IC chip, and a resonant circuit is formed by the antenna pattern and a capacitive element built in the IC chip. Thus, the RFID tag can wirelessly communicate with the external device through the antenna pattern.

Of such RFID tags, an RFID tag of an ultra high frequency (UHF) band mainly employs a dipole type in which a dipole antenna is used. A dipole type RFID tag is generally attached to, for example, cardboard or clothing other than a metallic material. This is because when the dipole type RFID tag is attached to the metallic material, a gain of the antenna deteriorates, and matching between the antenna and the IC chip collapses, and thus a communication distance is shortened.

Further, there has been suggested a technique of generating a mirror image current (an image current) and forming a current loop by disposing a loop antenna in a direction vertical to a metallic surface. According to such a technique, since a gain of the loop antenna is improved, the communication distance can be increased.

However, in the above-described conventional technique, there is a limitation to increasing the communication distance. Specifically, in the above-described conventional technique, the gain of the antenna can increase by forming a large current loop. However, merely increasing a current loop causes matching between the antenna and the IC chip to collapse. As a result, there arises a problem in that the communication distance is shortened.

Such a problem will be described in detail with reference to FIG. 17. FIG. 17 is a view illustrating the relationship between an IC chip and an antenna through an equivalent circuit. As in an example illustrated in FIG. 17, the relationship between an IC chip and an antenna for a UHF band RFID is expressed by an equivalent circuit. In the example illustrated in FIG. 17, Rcp represents parallel resistance of the IC chip, and Ccp represents parallel capacitance of the IC chip. The parallel resistance Rcp and the parallel capacitance Ccp are fixed values for each IC chip. For example, the parallel resistance Rcp is 2000 [Ω (ohm)], and the parallel capacitance Ccp is 1.0 [pF (picoFarad)].

Further, the antenna and the IC chip are directly connected with each other through two terminals without using a matching circuit therebetween. For this reason, the equivalent circuit at the antenna side is expressed by parallel resistance (radiation resistance) Rap and parallel inductance Lap. In the equivalent circuit illustrated in FIG. 17, when the parallel capacitance Ccp and the parallel inductance Lap satisfy a resonance condition at a frequency f0 of RFID, and the parallel resistance Rcp and the parallel resistance Rap have almost the same value, all power received by the antenna is supplied to the IC chip, and thus communication can be performed. However, when the parallel capacitance Ccp and the parallel inductance Lap do not satisfy the resonance condition at a frequency f0 of RFID or when the parallel resistance Rcp and the parallel resistance Rap have different values, matching between the antenna and the IC chip collapses, and thus the communication distance of the RFID is shortened.

Here, when the current loop increases, the parallel inductance Lap illustrated in FIG. 17 increases. This causes a problem in that matching with the parallel capacitance Ccp of the IC chip that is a fixed value is not made. That is, when the current loop increases, the parallel capacitance Ccp and the parallel inductance Lap may not satisfy the resonance condition, and thus the communication distance of RFID is shortened. Due to the foregoing reasons, in the conventional technique, there is a limitation to increasing the communication distance.

Patent Document: Japanese Patent Application Laid-open No. 2006-53833

SUMMARY

According to an aspect of an embodiment of the invention, an antenna sheet in which a transmission/reception antenna pattern is formed, includes a mounting section on which an integrated circuit (IC) chip electrically connected with the antenna pattern is mounted; a first loop forming section that extends from both ends of the mounting section that holds the IC chip therebetween and forms a first loop; an intersection portion that allows at least parts of both forefronts of the first loop forming section to intersect with each other; and a second loop forming section that extends from the forefronts of the first loop forming section that intersect in the intersection portion and forms a second loop outside the first loop.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. Further, an antenna sheet, a tag, and a method of manufacturing a tag disclosed in the present disclosure are not limited to the exemplary embodiments.

[a] First Embodiment

Figure 1:
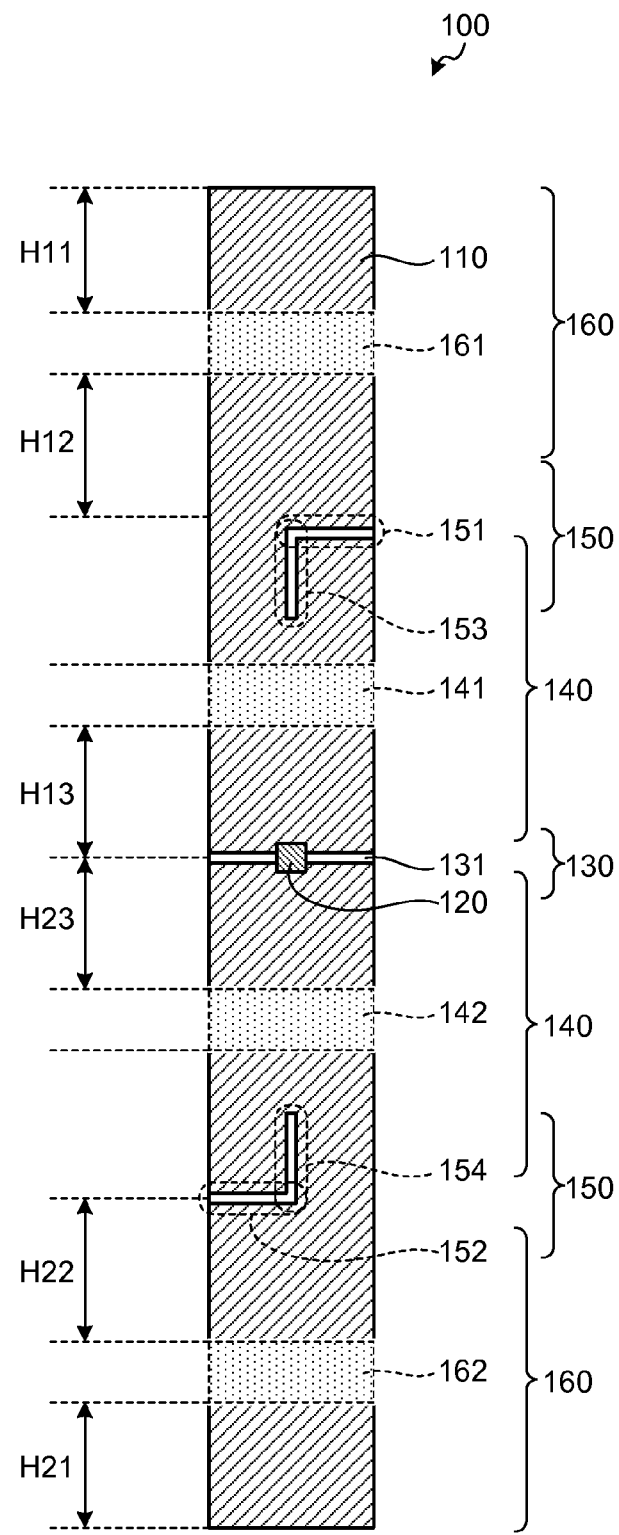
FIG. 1 is a plane view illustrating an antenna sheet according to a first embodiment.

First, an antenna sheet according to a first embodiment will be described with reference to FIG. 1. FIG. 1 is a plane view illustrating an antenna sheet according to a first embodiment. An antenna sheet 100 according to the first embodiment includes a transmission/reception antenna pattern 110 formed on a transparent base material such as a film member. For example, the antenna pattern 110 is formed by printing conductive ink on a film member or by etching a metallic conductor such as copper.

The antenna sheet 100 includes an area, in which the antenna pattern 110 is not formed, on a part of the transparent base material. In the example illustrated in FIG. 1, the antenna sheet 100 includes a non-antenna pattern area 131 as the area in which the antenna pattern 110 is not formed. In the antenna sheet 100, an IC chip 120 is mounted on a mounting section 130 including the non-antenna pattern area 131. The IC chip 120 is electrically connected with the antenna pattern 110.

As illustrated in FIG. 1, the antenna sheet 100 according to the first embodiment further includes a first loop forming section 140, an intersection portion 150, and a second loop forming section 160. The first loop forming section 140 is an area that extends from both ends of the mounting section 130 that holds the IC chip 120 therebetween toward both ends of the antenna sheet 100 and forms a first loop. Specifically, the first loop forming section 140 includes a first folding area 141 and a second folding area 142. The first loop forming section 140 forms the first loop such that the first folding area 141 and the second folding area 142 are folded to a back side of a mounting surface on which the IC chip 120 is mounted. The first loop formed by the first loop forming section 140 will be described later.

The intersection portion 150 allows at least parts of both forefronts of the first loop forming section 140 to intersect with each other. Specifically, the intersection portion 150 includes first slit sections 151 and 152. The first slit sections 151 and 152 are formed by forming slits in the both forefronts of the first loop forming section 140 in a direction vertical to an extension direction of the first loop forming section 140. That is, the first slit sections 151 and 152 are formed by forming slits in the both forefronts of the first loop forming section 140 in a short-side direction of the antenna sheet 100. In the example illustrated in FIG. 1, the first slit sections 151 and 152 are formed such that a slit is formed from a side edge of the antenna sheet 100 to nearly a center thereof.

The intersection portion 150 allows the both forefronts of the first loop forming section 140 to intersect with each other by fitting one forefront of the first loop forming section 140 into the first slit section formed in the other forefront of the first loop forming section 140. In the intersection portion 150 of the example illustrated in FIG. 1, one forefront of the first loop forming section 140 is fitted into the first slit section 152 formed in the other forefront of the first loop forming section 140. Further, in the intersection portion 150, the other forefront of the first loop forming section 140 is fitted into the first slit section 151 formed in one forefront of the first loop forming section 140. As described above, the intersection portion 150 has the both forefronts of the first loop forming section 140 to intersect with each other by fitting the first slit section 151 and the first slit section 152 into each other.

Further, as illustrated in FIG. 1, second slit sections 153 and 154 are formed in the intersection portion 150. The second slit sections 153 and 154 are formed by forming slits starting from parts of the first slit sections 151 and 152 in an extension direction of the first loop forming section 140. In the example illustrated in FIG. 1, the second slit section 153 is formed from the inside of the first slit section 151 toward the mounting section 130. The second slit section 154 is formed from the inside of the first slit section 152 toward the mounting section 130. The second slit sections 153 and 154 allow the both forefronts of the first loop forming sections 140 to slide in a long-side direction of the antenna sheet 100 in a state in which the both forefronts of the first loop forming sections 140 intersect with each other.

The second loop forming section 160 is an area that extends from the intersection portion 150 toward both ends of the antenna sheet 100 and forms a second loop. Specifically, the second loop forming section 160 includes a third folding area 161 and a fourth folding area 162. The second loop forming section 160 forms the second loop such that the third folding area 161 and the fourth folding area 162 are folded to the back side of the mounting surface on which the IC chip 120 is mounted. The second loop formed by the second loop forming section 160 will be described later.

Figure 2:
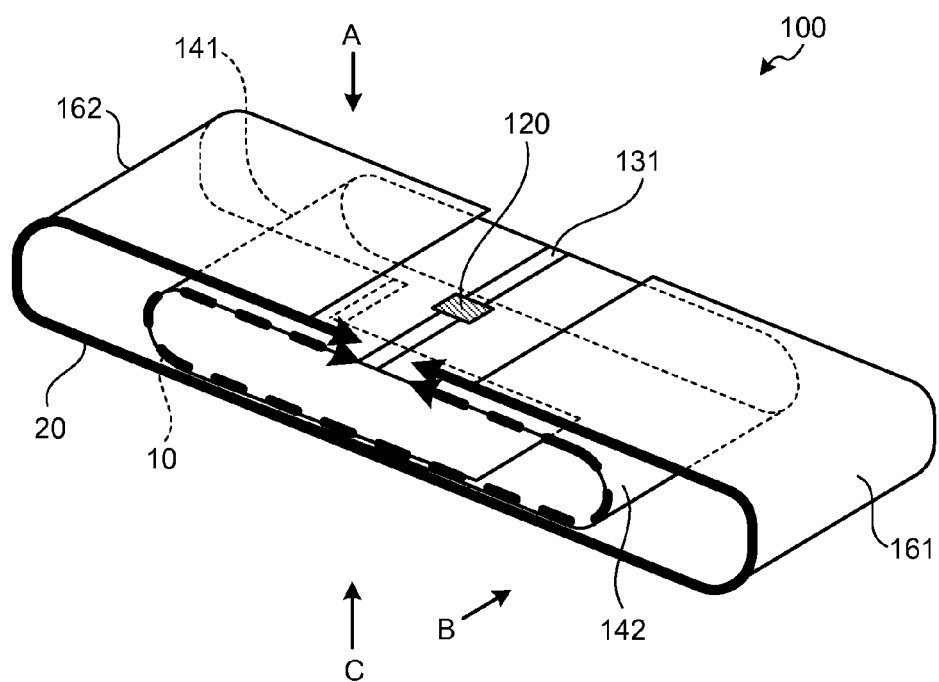
FIG. 2 is a perspective view illustrating a state in which the antenna sheet according to the first embodiment is assembled.
Figure 3:
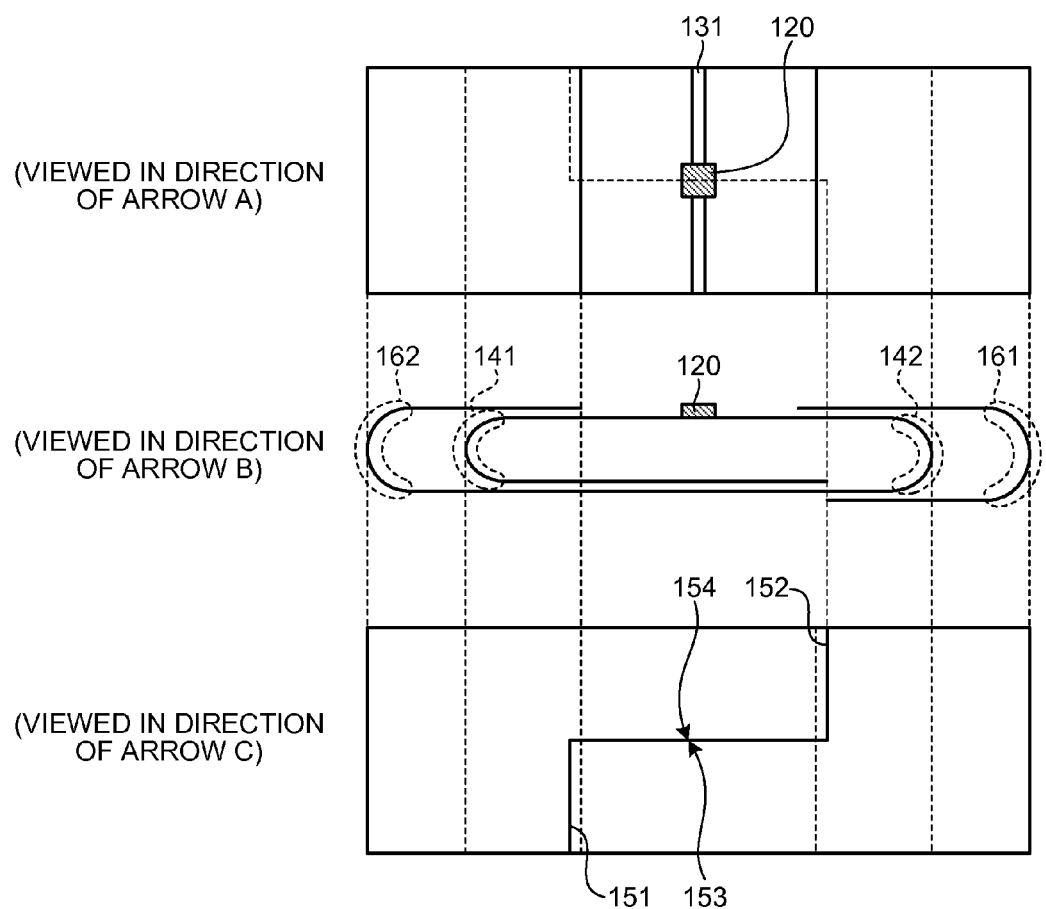
FIG. 3 is a view in which the antenna sheet illustrated in FIG. 2 is viewed in three directions.

Next, a state in which the antenna sheet 100 illustrated in FIG. 1 is assembled will be described with reference to FIGS. 2 and 3. FIG. 2 is a perspective view illustrating a state in which the antenna sheet 100 according to the first embodiment is assembled. FIG. 3 is a view in which the antenna sheet 100 illustrated in FIG. 2 is viewed in three directions. An upper part of FIG. 3 is a plane view in which the antenna sheet 100 is viewed in an arrow A direction illustrated in FIG. 2. A middle part of FIG. 3 is a side view in which the antenna sheet 100 is viewed in an arrow B direction illustrated in FIG. 2. Further, a lower part of FIG. 3 is a plane view in which the antenna sheet 100 is viewed in an arrow C direction illustrated in FIG. 2.

As illustrated in FIG. 2, in the antenna sheet 100 according to the first embodiment, a first loop 10 is formed by the first loop forming section 140 by folding the first folding area 141 and the second folding area 142. Specifically, as illustrated in the middle part of FIG. 3, in the antenna sheet 100, the first loop 10 is formed by folding the first folding area 141 and the second folding area 142 to the back side of the mounting surface on which the IC chip 120 is mounted.

Further, in the antenna sheet 100, the both forefronts of the first loop forming section 140 intersect through the intersection portion 150 by aligning the first slit section 151 and the first slit section 152 with each other. Thus, as illustrated in the middle part and the lower part of FIG. 3, the second loop forming section 160 extends from both ends of the intersection portion 150 to the outside of the first loop 10.

Further, in the antenna sheet 100, a second loop 20 is formed by the second loop forming section 160 by folding the third folding area 161 and the fourth folding area 162. Specifically, as illustrated in the middle part of FIG. 3, in the antenna sheet 100, the second loop 20 is formed by folding the third folding area 161 and the fourth folding area 162 in the direction of the first loop 10.

The first loop 10 formed by the first loop forming section 140 comes to have inductance that can be matched with parallel capacitance Ccp of the IC chip 120. Further, the second loop 20 formed by the second loop forming section 160 comes to have inductance for obtaining a gain of an antenna.

Figure 4:
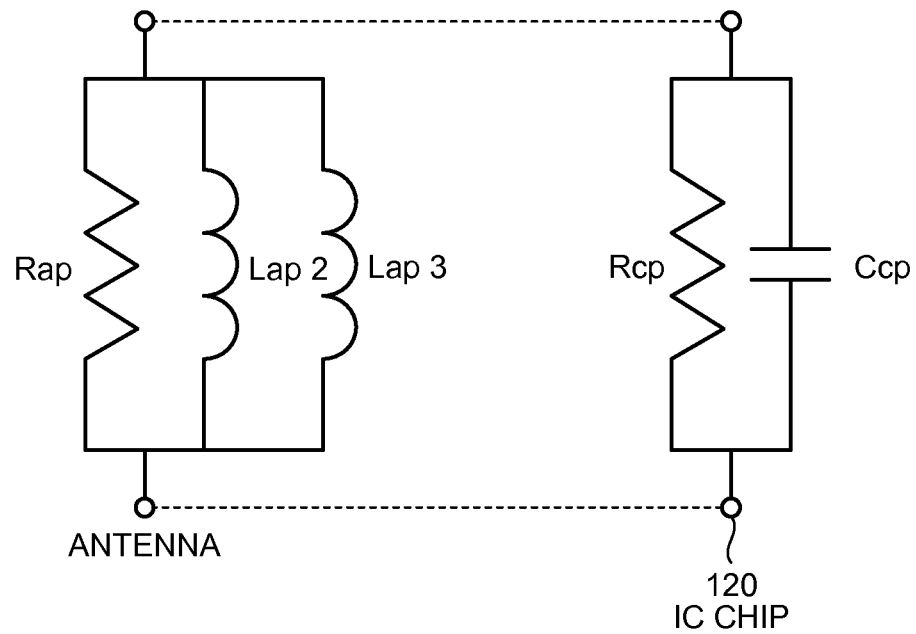
FIG. 4 is a view illustrating the relationship between an antenna formed by the antenna sheet according to the first embodiment and an IC chip through an equivalent circuit.

A detailed description will be made with reference to FIG. 4. FIG. 4 is a view illustrating the relationship between the antenna formed by the antenna sheet 100 according to the first embodiment and the IC chip 120 through an equivalent circuit. In the example illustrated in FIG. 4, Rcp represents parallel resistance of the IC chip 120, and Ccp represents parallel capacitance of the IC chip 120. The parallel resistance Rcp and the parallel capacitance Ccp are fixed values for each IC chip.

In the example illustrated in FIG. 4, Rap represents parallel resistance (radiation resistance) of the antenna side. Lap2 represents inductance obtained by the second loop 20. Lap3 represents inductance obtained by the first loop 10. That is, of the first loop 10 and the second loop 20, the first loop 10 that is at the inner side has inductance that is matched with the IC chip 120, and the second loop 20 that is at the outer side has inductance for obtaining the gain of the antenna.

A resonance condition of the equivalent circuit illustrated in FIG. 4 is expressed by the following Formula (1).

$$f0 = \frac{1}{2\pi\sqrt{(1/Lap2 + 1/Lap3) \times Ccp}} \quad (1)$$

The inductance Lap2 obtained by the second loop 20 has a value sufficiently larger than the inductance Lap3 obtained by the first loop 10, and "1/Lap2" of Formula (1) can almost be ignored. Thus, a value of "1/Lap3" has influence on whether or not the resonance condition of Formula (1) is satisfied.

For example, it is assumed that the parallel resistance Rcp of the IC chip 120 is 2000 [Ω], and the parallel capacitance Ccp is 1.0 [pF]. In this case, a value of the Lap3 that satisfies the resonance condition of Formula (1) is about 28 [nH (nano-Henry)]. Since the value of Lap3 is decided by the physical size of the first loop 10, it is possible to make Lap3 have a value of 28 [nH] by adjusting, for example, the length of the latitudinal direction of the first loop forming section 140. The physical size of the first loop 10 may be calculated using an electromagnetic field simulator.

When the physical size of the first loop 10 is decided as described above, the positions of the first folding area 141 and the second folding areas 142 are decided. The positions of the third folding area 161 and the fourth folding area 162 are decided so that the second loop 20 can physically be larger than the first loop 10. The first slit sections 151 and 152 are formed at positions at which the first loop 10 comes in contact with the second loop 20 when the folding areas are folded.

The both ends of the antenna pattern 110 are the forefronts of the second loop forming section 160 and are connected with an upper part of the first loop 10, so that the second loop 20 overlaps the first loop 10. The both ends of the antenna pattern 110 may be connected with the upper part of the first loop 10, for example, by a tape having conductivity or may be connected with the upper part of the first loop 10, for example, by a tape having no conductivity.

Thus, in the example illustrated in FIG. 1, a length H11 of an area included in the second loop forming section 160 is preferably larger than a value obtained by subtracting a length H23 from a length H12 illustrated in FIG. 1. Further, in the example illustrated in FIG. 1, a length H21 of an area included in the second loop forming section 160 is preferably larger than a value obtained by subtracting a length H13 from a length H22 illustrated in FIG. 1. As a result, in the antenna sheet 100, the second loop 20 larger than the first loop 10 can be formed, and the forefronts of the second loop forming section 160 can be connected with the upper part of the first loop 10.

Figure 5:
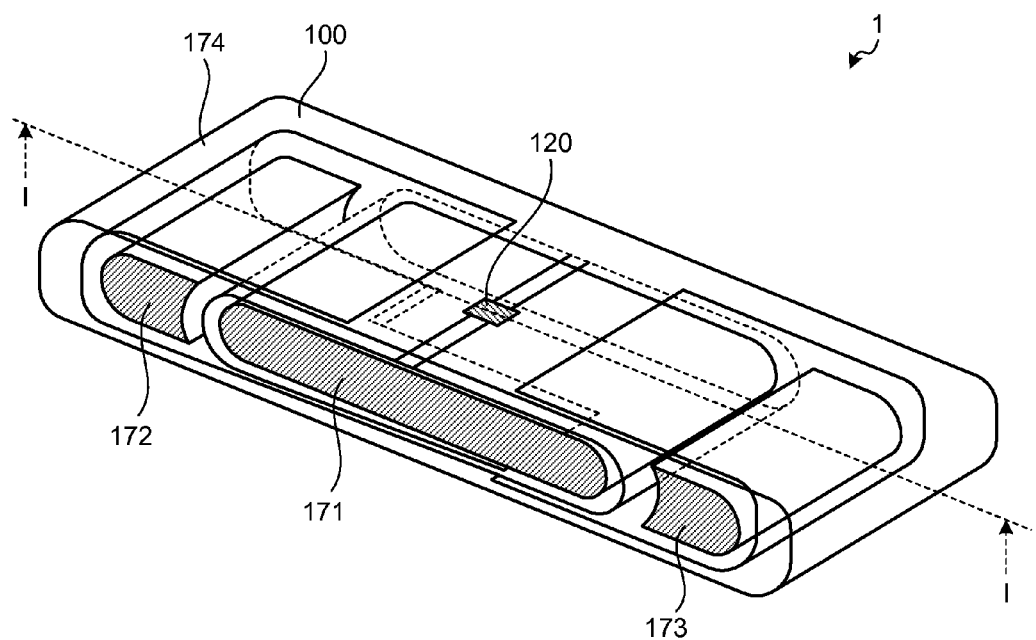
FIG. 5 is a perspective view illustrating an RFID tag having the antenna sheet according to the first embodiment.
Figure 6:
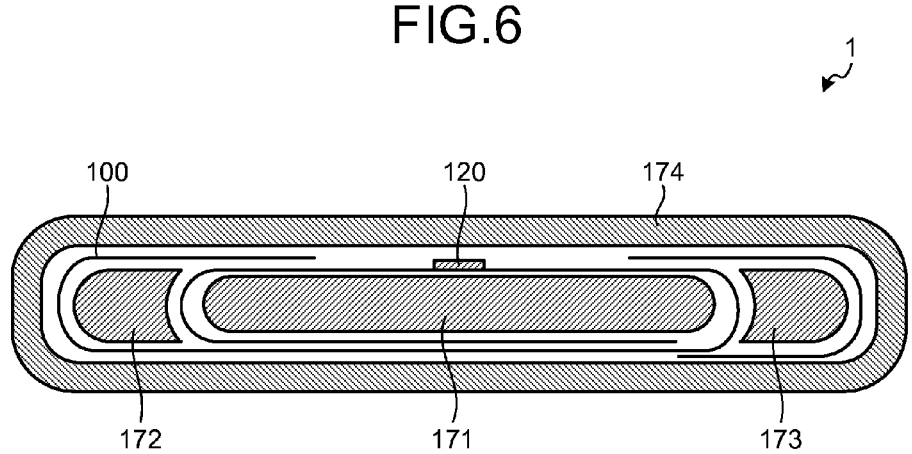
FIG. 6 is a schematic cross-sectional view taken along line I-I of FIG. 5.

Next, an RFID tag 1 having the antenna sheet 100 according to the first embodiment will be described with reference to FIGS. 5 and 6. FIG. 5 is a perspective view illustrating the RFID tag 1 having the antenna sheet 100 according to the first embodiment. FIG. 6 is a schematic cross-sectional view taken along line I-I of FIG. 5.

As illustrated in FIGS. 5 and 6, the RFID tag 1 includes a resin 171 inside the first loop 10 and resins 172 and 173 inside the second loop 20. For example, the resins 171, 172, and 173 include polycarbonate or silicon rubber. The RFID tag 1 may not include the resins 171, 172, and 173, but when the RFID tag 1 includes the resins 171, 172, and 173, the shapes of the first loop 10 and the second loop 20 can be maintained.

Further, the RFID tag 1 includes an exterior resin 174 on the outside of the antenna sheet 100. For example, the resin 174 includes polycarbonate or silicon rubber. Due to the exterior resin 174, the RFID tag 1 can be used in an actual environment as a robust RFID tag.

Figure 7:
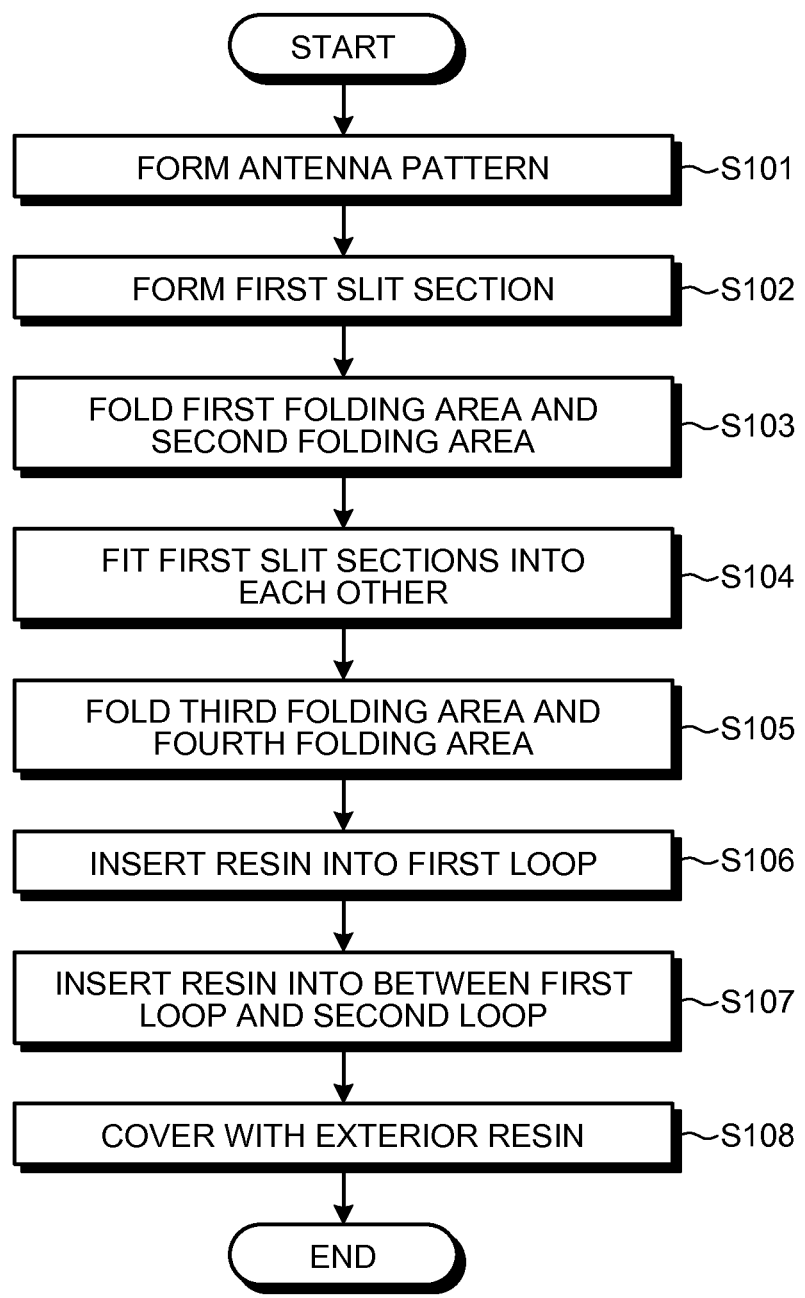
FIG. 7 is a flowchart illustrating an example of a method of manufacturing the RFID tag according to the first embodiment.
Figure 8:
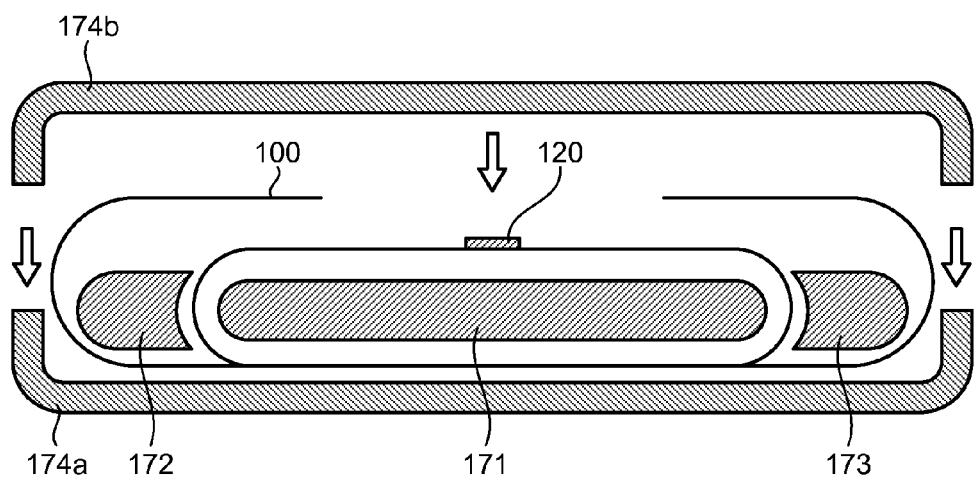
FIG. 8 is a view illustrating an example of a method of assembling the antenna sheet according to the first embodiment.

Next, a method of manufacturing the RFID tag 1 with reference to FIGS. 7 and 8 will be described. FIG. 7 is a flowchart illustrating an example of a method of manufacturing the RFID tag 1 according to the first embodiment. FIG. 8 is a view illustrating an example of a method of assembling the antenna sheet 100 according to the first embodiment.

As illustrated in FIG. 7, for the antenna sheet 100 according to the first embodiment, the transmission/reception antenna pattern 110 is formed on the transparent base material such as a film member (step S101). Subsequently, for the antenna sheet 100, the first slit sections 151 and 152 are formed (step S102).

Here, step S102 may be performed before step S101. That is, for the antenna sheet 100, the antenna pattern 110 may be formed on the transparent base material such as a film member in which the first slit sections 151 and 152 are formed.

Subsequently, for the antenna sheet 100, the first folding area 141 and the second folding area 142 are folded (step S103). As a result, the first loop forming section 140 of the antenna sheet 100 forms the first loop 10 as illustrated in FIG. 2.

Subsequently, for the antenna sheet 100, the first slit section 151 is aligned with the first slit section 152 (step S104). As a result, the both forefronts of the first loop forming section 140 intersect with each other through the intersection portion 150.

Subsequently, for the antenna sheet 100, the third folding area 161 and the fourth folding area 162 are folded (step S105). As a result, the second loop forming section 160 of the antenna sheet 100 forms the second loop 20 on the outside of the first loop 10 as illustrated in FIG. 2.

Subsequently, for the antenna sheet 100, as illustrated in FIGS. 5 and 6, the resin 171 is inserted into a space formed inside the first loop 10 (step S106). Further, for the antenna sheet 100, as illustrated in FIGS. 5 and 6, the resins 172 and 173 are inserted into spaces formed between the first loop 10 and the second loop 20 (step S107).

Subsequently, as illustrated in FIG. 8, the antenna sheet 100 that is assembled as described above is disposed on a concave section of a concave resin 174a. The antenna sheet 100 is covered with the exterior resin 174 by bonding a peripheral edge of a concave resin 174b with a peripheral edge of the concave resin 174a (step S108). Accordingly, the RFID tag 1 in which the antenna sheet 100 is covered with the resin 174 is formed.

For example, the IC chip 120 may be mounted on the antenna sheet after step S101, may be mounted on the antenna sheet after step S102, or may be mounted on the antenna sheet after S105.

As described above, the RFID tag 1 having the antenna sheet 100 according to the first embodiment include the first loop 10 that is matched with the IC chip 120 and the second loop 20 for obtaining the gain of the antenna. Thus, the RFID tag 1 can increase the communication distance while maintaining a junction with the IC chip 120. Further, the antenna sheet 100 according to the first embodiment can form the first loop 10 and the second loop 20 using a single piece of sheet. Thus, by using the antenna sheet 100 according to the first embodiment, the RFID tag 1 can easily be manufactured, and the manufacturing cost can be reduced.

[b] Second Embodiment

The first embodiment has been described in connection with the example in which the first loop 10 and the second loop 20 are formed using the single piece of antenna sheet 100 illustrated in FIG. 1. However, the shape of the antenna sheet for forming the first loop 10 and the second loop 20 is not limited to the shape of the antenna sheet 100 illustrated in FIG. 1. A second embodiment will be described in connection with an example of an antenna sheet having a shape different from the antenna sheet 100 illustrated in FIG. 1.

Figure 9:
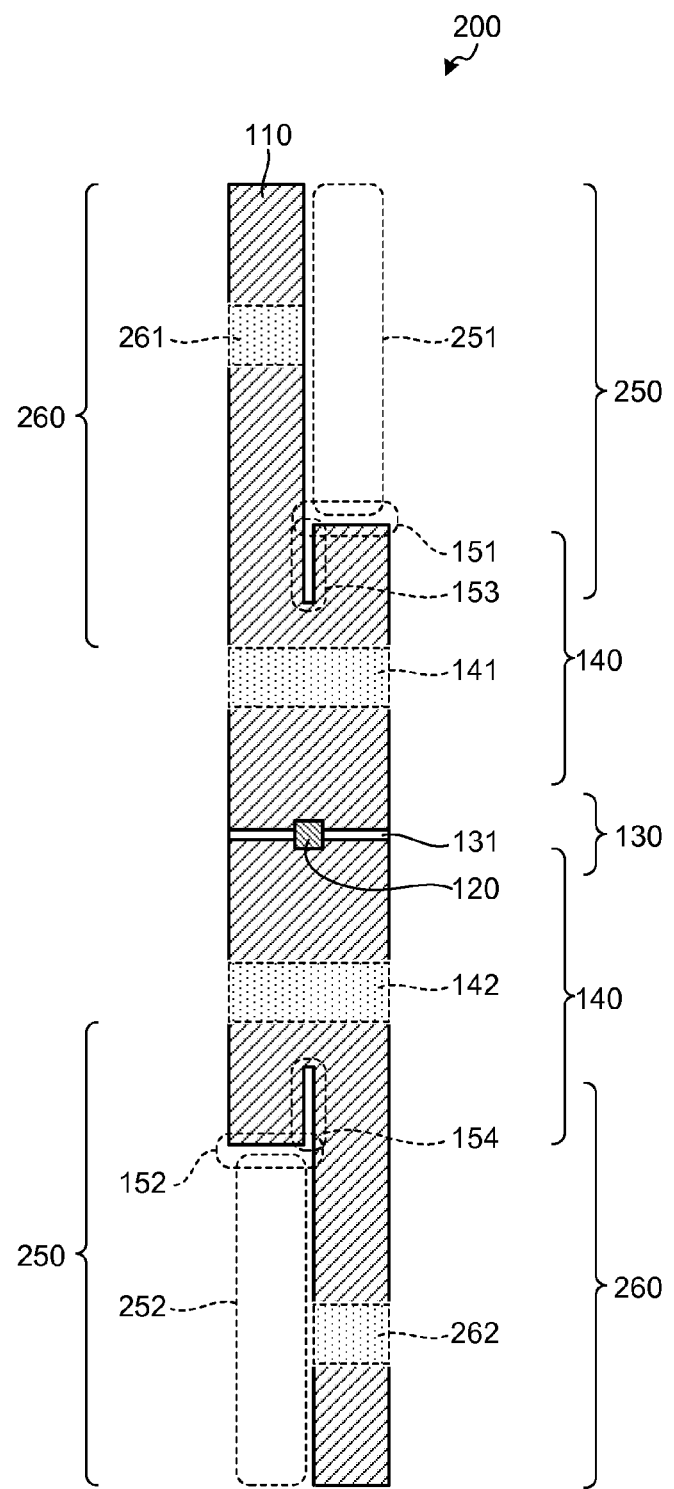
FIG. 9 is a plane view illustrating an antenna sheet according to a second embodiment.

First, an antenna sheet according to a second embodiment will be described with reference to FIG. 9. FIG. 9 is a plane view illustrating an antenna sheet according to a second embodiment. An antenna sheet 200 according to the second embodiment includes a transmission/reception antenna pattern 110 formed on a transparent base material such as a film member, similarly to the antenna sheet 100 according to the first embodiment.

The antenna sheet 200 includes a non-antenna pattern area 131 on a part of the transparent base material. In the antenna sheet 200, an IC chip 120 is mounted on a mounting section 130 including the non-antenna pattern area 131.

As illustrated in FIG. 9, the antenna sheet 200 further includes a first loop forming section 140, an intersection portion 250, and a second loop forming section 260. The first loop forming section 140 includes a first folding area 141 and a second folding area 142. The first folding area 141 and the second folding area 142 are folded, so that the first loop is formed.

The intersection portion 250 allows at least parts of the both forefronts of the first loop forming section 140 to intersect with each other. Similarly to the intersection portion 150 illustrated in FIG. 1, the intersection portion 250 includes first slit sections 151 and 152 and second slit sections 153 and 154. The intersection portion 250 has the both forefront of the first loop forming section 140 to intersect by aligning the first slit sections 151 and 152 with each other.

Further, in the intersection portion 250 according to the second embodiment, a first notch section 251 in which an area from the first slit section 151 to the forefront of the antenna sheet 200 is cut out and a second notch section 252 in which an area from the first slit section 152 to the forefront of the antenna sheet 200 is cut out are formed. In the intersection portion 250, a part of one forefront of the first loop forming section 140 in which the first notch section 251 is not formed is inserted into the second notch section 252 formed in the other forefront of the first loop forming section 140. Further, in the intersection portion 250, a part of the other forefront of the first loop forming section 140 in which the second notch section 252 is not formed is inserted into the first notch section 251 formed in one forefront of the first loop forming section 140.

The second loop forming section 260 is an area that extends from both ends of the intersection portion 250 toward both ends of the antenna sheet 200 and forms a second loop. Specifically, the second loop forming section 260 includes a third folding area 261 and a fourth folding area 262. The second loop forming section 260 forms the second loop such that the third folding area 261 and the fourth folding area 262 are folded to the back side of the mounting surface on which the IC chip 120 is mounted.

Here, when the third folding area 261 is folded, the second loop forming section 260 having the third folding area 261 is inserted into the second notch section 252. The forefront of the second loop forming section 260 having the third folding area 261 is connected with an upper part of the first loop. Further, when the fourth folding area 262 is folded, the second loop forming section 260 having the fourth folding area 262 is inserted into the first notch section 251. The forefront of the second loop forming section 260 having the fourth folding area 262 is connected with the upper part of the first loop.

Figure 10:
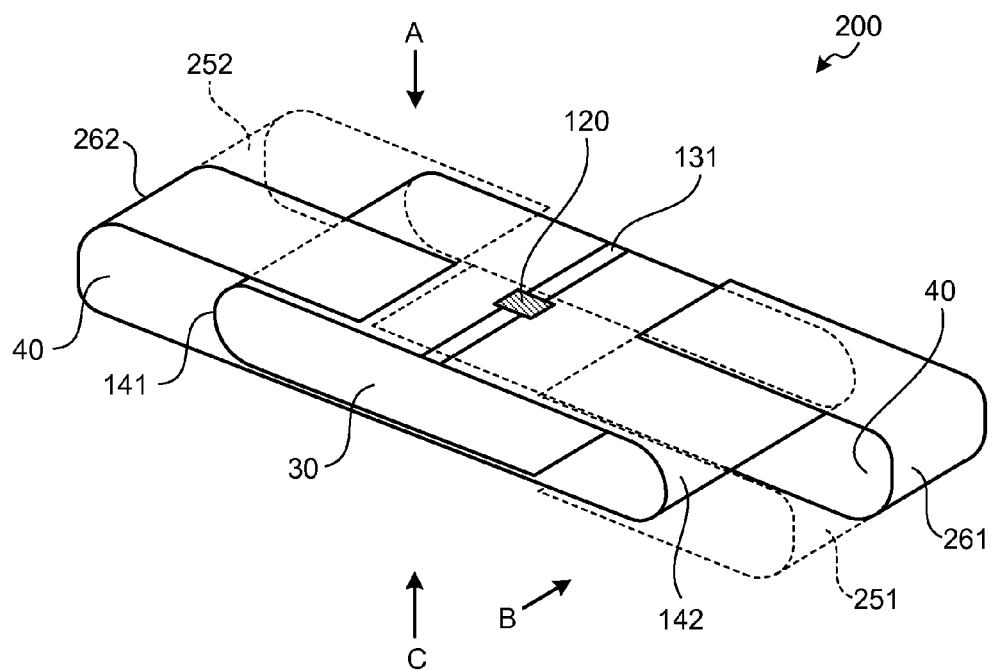
FIG. 10 is a perspective view illustrating a state in which the antenna sheet according to the second embodiment is assembled.
Figure 11:
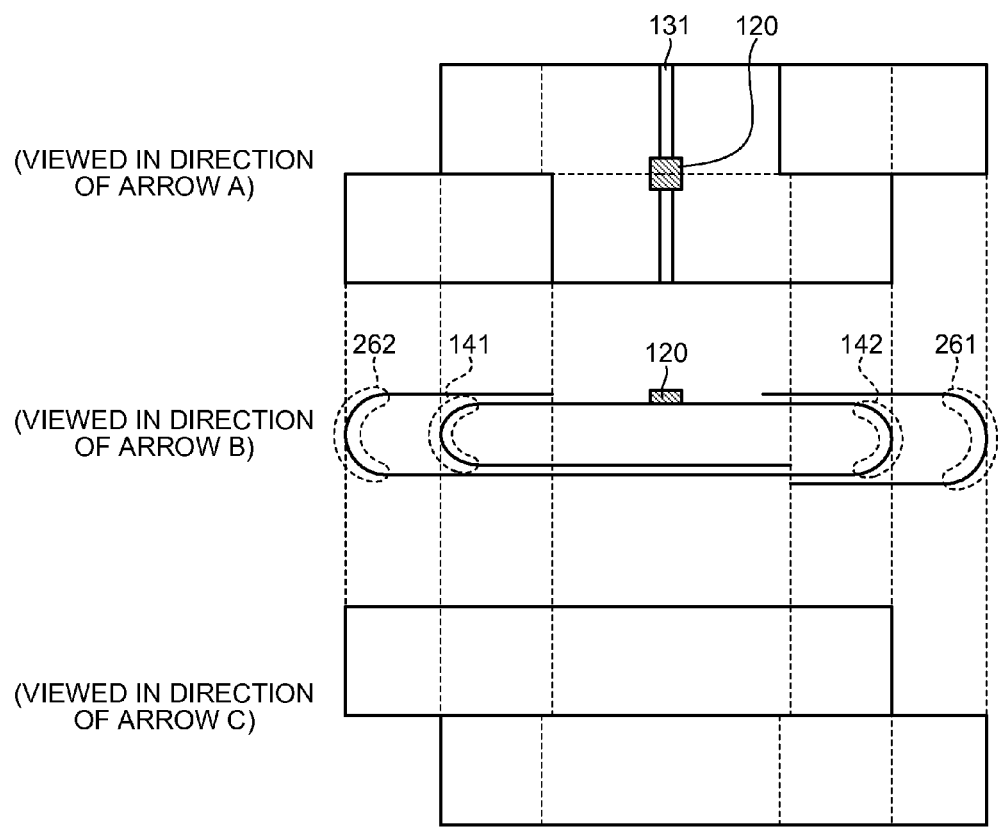
FIG. 11 is a view in which the antenna sheet illustrated in FIG. 10 is viewed in three directions.

Next, a state in which the antenna sheet 200 illustrated in FIG. 9 is assembled will be described with reference to FIGS. 10 and 11. FIG. 10 is a perspective view illustrating a state in which the antenna sheet 200 according to the second embodiment is assembled. FIG. 11 is a view in which the antenna sheet 200 illustrated in FIG. 10 is viewed in three directions. An upper part of FIG. 11 is a plane view in which the antenna sheet 200 is viewed in an arrow A direction illustrated in FIG. 10. A middle part of FIG. 11 is a side view in which the antenna sheet 200 is viewed in an arrow B direction illustrated in FIG. 10. Further, a lower part of FIG. 11 is a plane view in which the antenna sheet 200 is viewed in an arrow C direction illustrated in FIG. 10.

As illustrated in FIG. 10, in the antenna sheet 200 according to the second embodiment, a first loop 30 is formed by the first loop forming section 140 by folding the first folding area 141 and the second folding area 142. Specifically, as illustrated in the middle part of FIG. 11, in the antenna sheet 200, the first loop 30 is formed by folding the first folding area 141 and the second folding area 142 to the back side of the mounting surface on which the IC chip 120 is mounted.

Further, in the antenna sheet 200, the both forefronts of the first loop forming section 140 intersect through the intersection portion 250 by aligning the first slit section 151 and the first slit section 152 with each other. Thus, as illustrated in the lower part of FIG. 11, the second loop forming section 260 extends from both ends of the intersection portion 250 to the outside of the first loop 30.

Further, in the antenna sheet 200, a second loop 40 is formed by the second loop forming section 260 by folding the third folding area 261 and the fourth folding area 262. Specifically, as illustrated in the middle part of FIG. 11, in the antenna sheet 200, the second loop 40 is formed by folding the third folding area 261 and the fourth folding area 262 in the direction of the first loop 30.

At this time, as illustrated in FIG. 10, when the third folding area 261 is folded, the second loop forming section 260 having the third folding area 261 is inserted into the second notch section 252, and the forefront of the second loop forming section 260 is connected with the upper part of the first loop 30. Further, when the fourth folding area 262 is folded, the second loop forming section 260 having the fourth folding area 262 is inserted into the first notch section 251, and the forefront of the second loop forming section 260 is connected with the upper part of the first loop 30.

The first loop 30 formed by the first loop forming section 140 comes to have inductance that can be matched with the parallel capacitance Ccp of the IC chip 120 similarly to the example illustrated in the first embodiment. Further, the second loop 40 formed by the second loop forming section 260 comes to have inductance capable of obtaining a large gain of an antenna.

As described above, the antenna sheet 200 according to the second embodiment includes the first notch section 251 and the second notch section 252. The first notch section 251 and the second notch section 252 can easily be formed by cutting out the first notch section 251 and the second notch section 252 from the antenna sheet. That is, the antenna sheet 200 according to the second embodiment can easily be manufactured. Further, since the antenna sheet 200 according to the second embodiment can be assembled as in the example illustrated in FIG. 10 without twisting the antenna sheet 200, the RFID tag can easily be manufactured.

[c] Third Embodiment

A third embodiment will be described in connection with an example of an antenna sheet having a shape that is different from the antenna sheet 100 illustrated in FIG. 1 and the antenna sheet 200 illustrated in FIG. 9.

Figure 12:
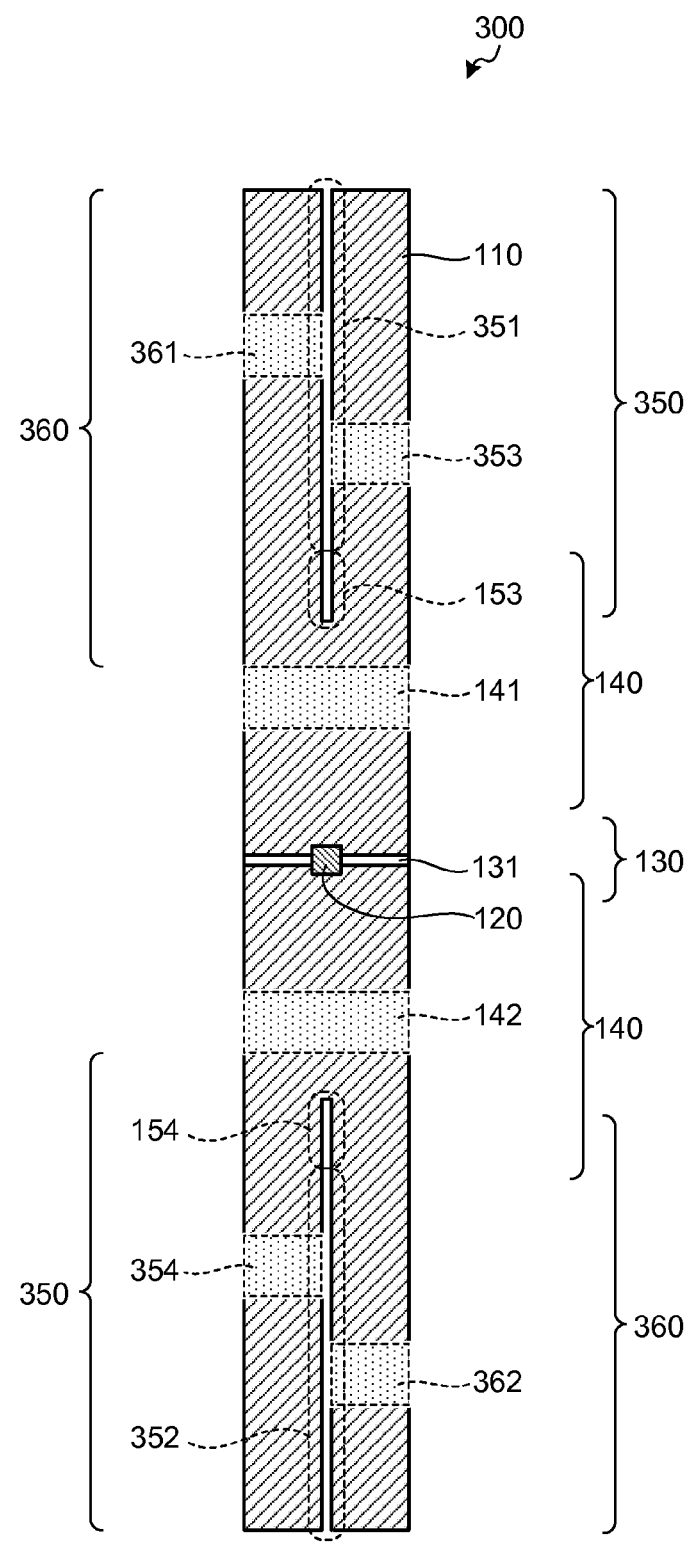
FIG. 12 is a plane view illustrating an antenna sheet according to a third embodiment.

First, an antenna sheet according to a third embodiment will be described with reference to FIG. 12. FIG. 12 is a plane view illustrating an antenna sheet according to a third embodiment. An antenna sheet 300 according to the third embodiment includes a transmission/reception antenna pattern 110 formed on a transparent base material such as a film member, similarly to the antenna sheet 100 according to the first embodiment. The antenna sheet 300 includes a non-antenna pattern area 131 on a part of the transparent base material. In the antenna sheet 300, an IC chip 120 is mounted on a mounting section 130 including the non-antenna pattern area 131.

As illustrated in FIG. 12, the antenna sheet 300 further includes a first loop forming section 140, an intersection portion 350, and a second loop forming section 360. The first loop forming section 140 includes a first folding area 141 and a second folding area 142. The first folding area 141 and the second folding area 142 are folded, so that a first loop is formed.

The intersection portion 350 has at least parts of the both forefronts of the first loop forming section 140 to intersect with each other. The intersection portion 350 includes second slit sections 153 and 154 and third slit sections 351 and 352. The third slit sections 351 and 352 are slits that are formed from nearly the center of the forefront of the first loop forming section 140 to the forefront of the antenna sheet 300.

The intersection portion 350 has a third folding area 353 formed in one of the two areas divided by the third slit section 351. Further, the intersection portion 350 has a fourth folding area 354 formed in one of the two areas divided by the third slit section 352. In the intersection portion 350, a storage area having the third folding area 353 is stored in the first loop, and a storage area having the fourth folding area 354 is stored in the first loop. In the intersection portion 350, an intersection is made by inserting a part of one forefront of the first loop forming section 140 that is not the storage area side into a space formed by storing the storage area formed on the other forefront in the first loop.

The second loop forming section 360 is an area that extends from both ends of the intersection portion 350 toward both ends of the antenna sheet 300 and forms a second loop. Specifically, the second loop forming section 360 corresponds to one of the two areas divided by the third slit section 351 and one of the two areas divided by the third slit section 352. The second loop forming section 360 includes a fifth folding area 361 formed in one of the two areas divided by the third slit section 351. Further, the second loop forming section 360 includes a sixth folding area 362 formed in one of the two areas divided by the third slit section 352.

The second loop forming section 260 forms the second loop such that the fifth folding area 361 and the sixth folding area 362 are folded to the back side of the mounting surface on which the IC chip 120 is mounted.

Here, when the fourth folding area 354 is folded, a storage area from the fourth folding area 354 to the forefront of the antenna sheet 300 is stored inside the first loop. In this state, when the fifth folding area 361 is folded, the second loop forming section 360 having the fifth folding area 361 is inserted into an empty space formed by storing the above-described storage area inside the first loop.

Further, when the third folding area 353 is folded, a storage area from the third folding area 353 to the forefront of the antenna sheet 300 is stored inside the first loop. In this state, when the sixth folding area 362 is folded, the second loop forming section 360 having the sixth folding area 362 is inserted into an empty space formed by storing the above-described storage area inside the first loop.

Figure 13:
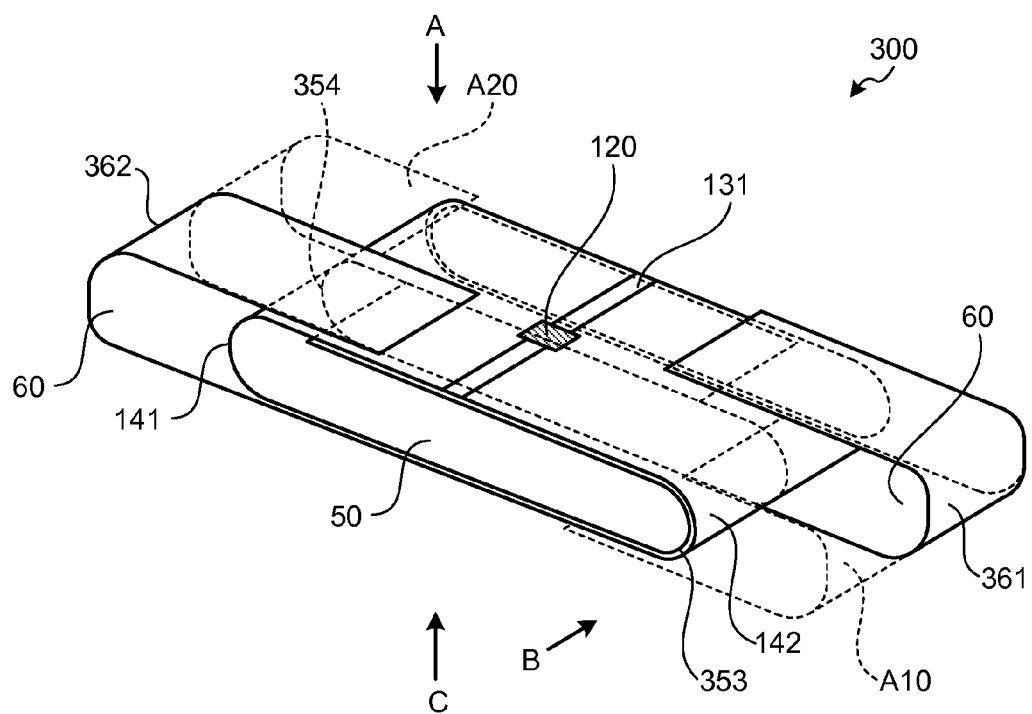
FIG. 13 is a perspective view illustrating a state in which the antenna sheet according to the third embodiment is assembled.
Figure 14:
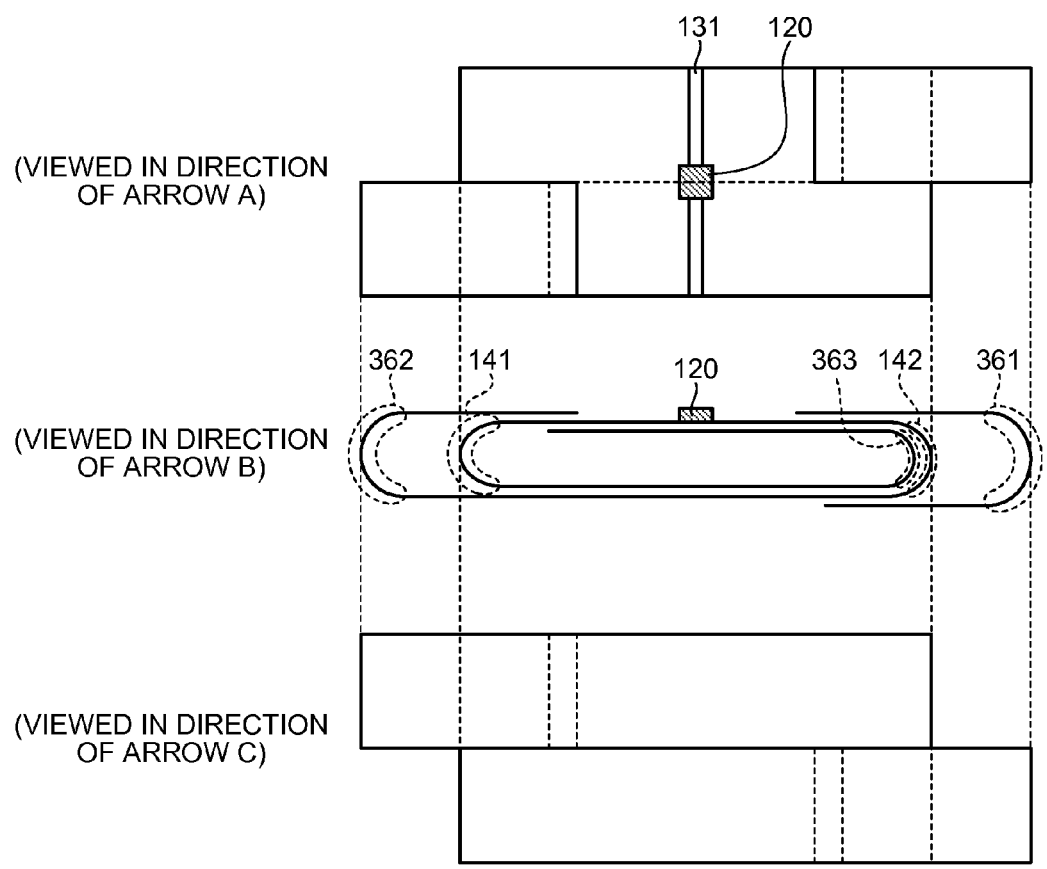
FIG. 14 is a view in which the antenna sheet illustrated in FIG. 13 is viewed in three directions.

Next, a state in which the antenna sheet 300 illustrated in FIG. 12 is assembled will be described with reference to FIGS. 13 and 14. FIG. 13 is a perspective view illustrating a state in which the antenna sheet 300 according to the third embodiment is assembled. FIG. 14 is a view in which the antenna sheet 300 illustrated in FIG. 13 is viewed in three directions. An upper part of FIG. 14 is a plane view in which the antenna sheet 300 is viewed in an arrow A direction illustrated in FIG. 13. A middle part of FIG. 14 is a side view in which the antenna sheet 300 is viewed in an arrow B direction illustrated in FIG. 13. Further, a lower part of FIG. 14 is a plane view in which the antenna sheet 300 is viewed in an arrow C direction illustrated in FIG. 13.

As illustrated in FIG. 13, in the antenna sheet 300 according to the third embodiment, a first loop 50 is formed by the first loop forming section 140 by folding the first folding area 141 and the second folding area 142. Specifically, as illustrated in the middle part of FIG. 14, in the antenna sheet 300, the first loop 50 is formed by folding the first folding area 141 and the second folding area 142 to the back side of the mounting surface on which the IC chip 120 is mounted.

In the antenna sheet 300, as illustrated in FIG. 13, the third folding area 353 is folded to the back side of the mounting surface of the IC chip 120, and so a storage area from the third folding area 353 to the forefront of the antenna sheet 300 is stored inside the first loop 50. Further, in the antenna sheet 300, as illustrated in FIG. 13, the fourth folding area 354 is folded to the back side of the mounting surface of the IC chip 120, and so a storage area from the fourth folding area 354 to the forefront of the antenna sheet 300 is stored inside the first loop 50.

Further, in the antenna sheet 300, the fifth folding area 361 and the sixth folding area 362 are folded, and so a second loop 60 is formed by the second loop forming section 360. Specifically, as illustrated in the middle part of FIG. 14, in the antenna sheet 300, the second loop 60 is formed by folding the fifth folding area 361 and the sixth folding area 362 in the direction of the first loop 50.

The first loop 50 formed by the first loop forming section 140 comes to have inductance that can be matched with the parallel capacitance Ccp of the IC chip 120 similarly to the example illustrated in the first embodiment. Further, the second loop 60 formed by the second loop forming section 360 comes to have inductance capable of obtaining a large gain of an antenna.

As described above, the antenna sheet 300 according to the third embodiment includes the fifth slit section 351 and the sixth slit section 352. The fifth slit section 351 and the sixth slit section 352 can easily be formed by cutting a part of the antenna sheet. That is, the antenna sheet 300 according to the third embodiment can easily be manufactured. Further, since the antenna sheet 300 according to the third embodiment can be assembled without twisting the antenna sheet 300 as in the example illustrated in FIG. 13, the RFID tag can easily be manufactured.

[d] Fourth Embodiment

The first to third embodiments have been described in connection with the examples of making a junction with the IC chip 120 by the inductance Lap3 obtained by the first loop. However, by forming a condenser coupling (C coupling) pattern of an interdigital shape in the antenna pattern 110, a junction with the IC chip 120 may be made by inductance obtained by the first loop and parallel capacitance obtained by the C coupling pattern. Thus, a fourth embodiment will be described in connection with an example of forming the C coupling pattern of the interdigital shape in the antenna pattern.

Figure 15:
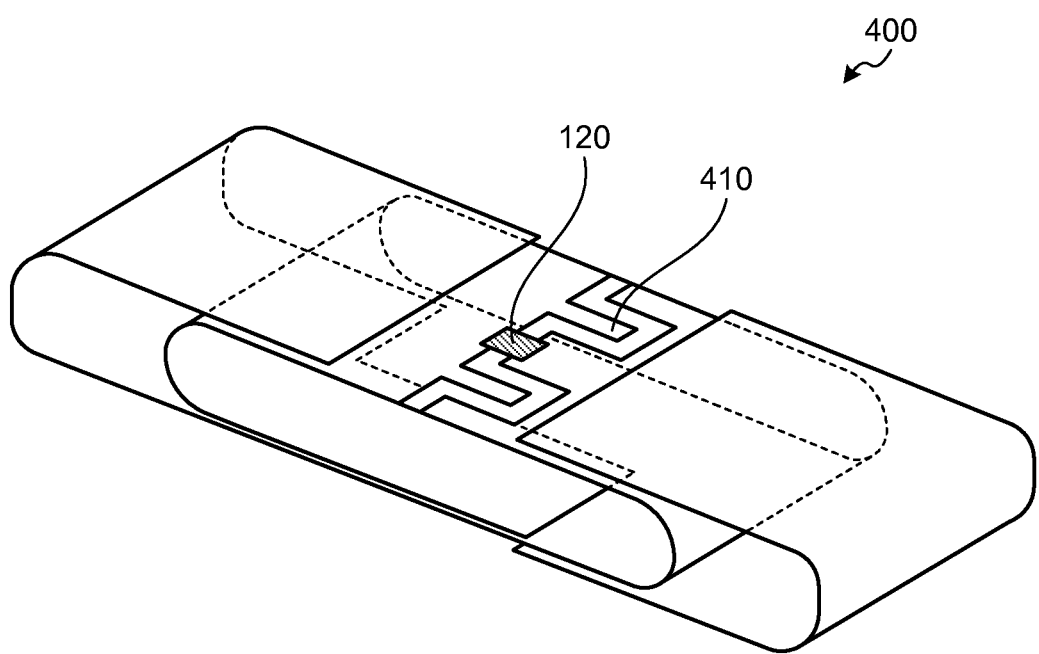
FIG. 15 is a perspective view illustrating a state in which an antenna sheet according to a fourth embodiment is assembled.

FIG. 15 is a perspective view illustrating a state in which an antenna sheet 400 according to a fourth embodiment is assembled. The shape of the antenna sheet 400 illustrated in FIG. 15 is the same as the shape of the antenna sheet 100 illustrated in FIG. 1. However, the antenna sheet 400 includes a C coupling pattern 410 of an interdigital shape formed in the antenna pattern 110.

Figure 16:
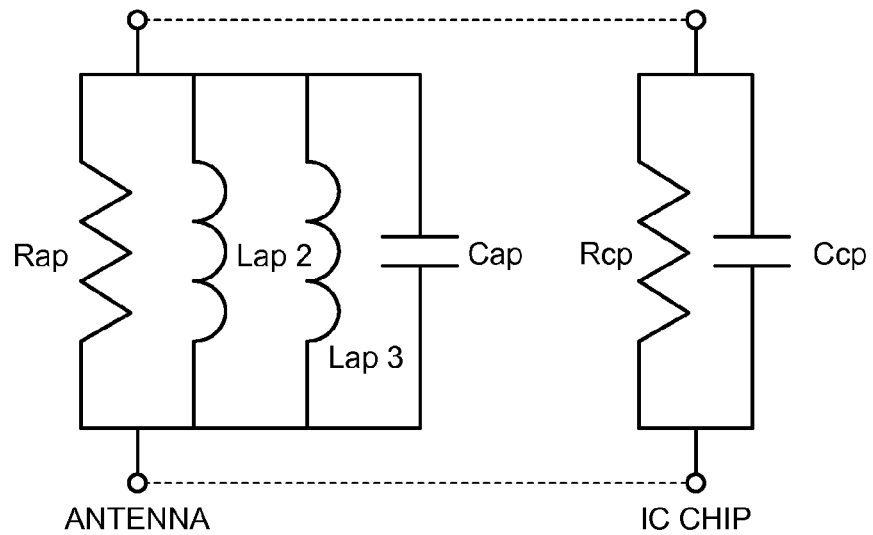
FIG. 16 illustrates the relationship between an antenna formed by the antenna sheet according to the fourth embodiment and an IC chip through an equivalent circuit.
Figure 17:
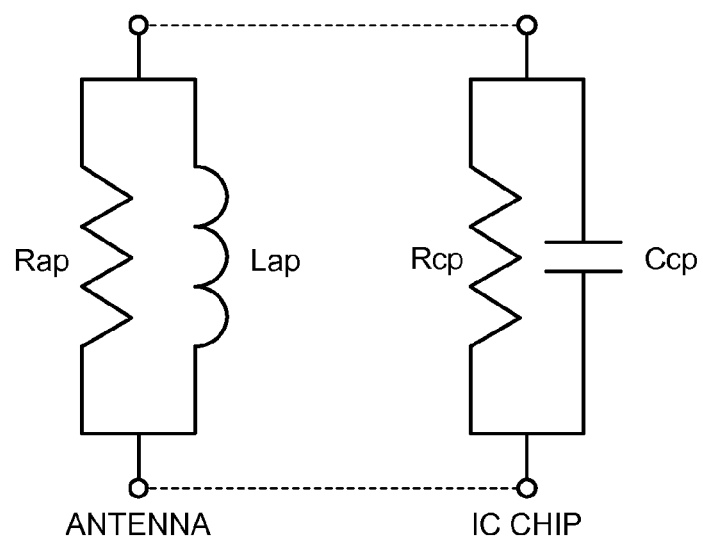
FIG. 17 is a view illustrating the relationship between an IC chip and an antenna through an equivalent circuit.

The C coupling pattern 410 has parallel capacitance that can be matched with parallel capacitance Ccp of the IC chip 120. FIG. 16 illustrates the relationship between an antenna formed by the antenna sheet 400 according to the fourth embodiment and the IC chip 120 through an equivalent circuit. As illustrated in FIG. 16, the equivalent circuit of the antenna sheet 400 according to the fourth embodiment additionally includes parallel capacitance Cap obtained by the C coupling pattern 410 compared to the equivalent circuit illustrated in FIG. 4.

That is, in the antenna sheet 40 according to the fourth embodiment, matching with the parallel capacitance Ccp of the IC chip 120 is performed by the inductance Lap3 implemented by the first loop 10 and the parallel capacitance Cap implemented by the C coupling pattern 410.

A resonance condition of the equivalent circuit illustrated in FIG. 16 is expressed by the following Formula (2).

$$f0 = \frac{1}{2\pi \sqrt{(1/\text{Lap2} + 1/\text{Lap3}) \times (Ccp + Cap)}} \quad (2)$$

In the case of using the antenna sheet 400 according to the fourth embodiment, since the parallel capacitance Cap can be adjusted by the C coupling pattern 410, the sizes of the first loop 10 and the second loop 20 can have fixed value when manufacturing the RFID tag. For example, the first folding area 141, the second folding area 142, the third folding area 161, and the fourth folding area 162 are formed at fixed positions of the antenna sheet 400. In the experimental stage, a test on the communication distance is performed while changing the shape of the interdigital to be formed on the antenna pattern 110 after assembling the antenna sheet 400. The shape of the interdigital to be formed on the antenna sheet 400 that becomes a product can be decided based on the test result.

The fourth embodiment has been described in connection with the example of forming the C coupling pattern of the interdigital shape in the antenna sheet 100 illustrated in FIG. 1. However, the C coupling pattern of the interdigital shape may be formed in the antenna sheet 200 illustrated in FIG. 9 or the antenna sheet 300 illustrated in FIG. 12.

According to an aspect of an antenna sheet disclosed in the present disclosure, there is an effect capable of increasing the communication distance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An antenna sheet in which a transmission/reception antenna pattern is formed, comprising:
   a mounting section on which an integrated circuit (IC) chip electrically connected with the antenna pattern is mounted;
   a first loop forming section that extends from both ends of the mounting section that holds the IC chip therebetween and forms a first loop;
   an intersection portion that includes at least one slit extending from edge to inside of the antenna sheet to allow at least parts of both ends of the first loop forming section to intersect with each other; and a second loop forming section that extends from the ends of the first loop forming section that intersect in the intersection portion and forms a second loop outside the first loop.

2. The antenna sheet according to claim 1,
wherein the intersection portion includes a first slit section formed by forming a slit in both ends of the first loop forming section in a direction vertical to an extension direction of the first loop forming section, and
an intersection is made by fitting one end of the first loop forming section into the first slit section of the other end.

3. The antenna sheet according to claim 2,
wherein the intersection portion includes a second slit section formed by forming a slit from a part of the first slit section in the extension direction.

4. The antenna sheet according to claim 1,
wherein the intersection portion includes a first slit section formed by forming a slit in both ends of the first loop forming section in a direction vertical to an extension direction of the first loop forming section and a notch section formed by cutting an area extending from the first slit section in the extension direction, and
an intersection is made by inserting a part of one end of the first loop forming section in which the notch section is not formed into the notch section formed in the other end of the first loop forming section.

5. The antenna sheet according to claim 4,
wherein the intersection portion includes a second slit section formed by forming a slit from a part of the first slit section in the extension direction.

6. The antenna sheet according to claim 1,
wherein the intersection portion includes a third slit section formed by forming a slit from nearly the center of both ends of the first loop forming section in an extension direction of the first loop forming section, and
an intersection is made by storing a storage area that is one of two areas divided by the third slit section inside the first loop and inserting a part of one end of the first loop forming section that is not the storage area side into a space formed by storing a storage area formed in the other end of the first loop forming section inside the first loop.

7. The antenna sheet according to claim 1,
wherein the intersection portion includes a first slit section formed by forming a slit along a short-side direction of the antenna sheet in both ends of the first loop forming section, and
an intersection is made by fitting one end of the first loop forming section into the first slit section of the other end.

8. The antenna sheet according to claim 1,
wherein the intersection portion includes a first slit section formed by forming a slit along a short-side direction of the antenna sheet in both ends of the first loop forming section and a notch section formed by cutting an area extending from the first slit section to an extension direction of the first loop forming section, and
an intersection is made by inserting a part of one end of the first loop forming section in which the notch section is not formed into the notch section formed in the other end of the first loop forming section.

9. A tag, comprising:
a transmission/reception antenna pattern;
an integrated circuit (IC) chip electrically connected with the antenna pattern; and
an antenna sheet in which the transmission/reception antenna pattern is formed and the IC chip is mounted,
wherein the antenna sheet comprises:
a first loop section formed by a first area that extends from both ends of a mounting section, on which the IC chip is mounted, that holds the IC chip therebetween,
an intersection portion that includes at least one slit extending from edge to inside of the antenna sheet to allow at least parts of both ends of the first area to intersect with each other; and
a second loop section formed outside the first loop section by a second area that extends from the ends of the first loop section that intersect in the intersection portion.

10. The tag according to claim 9, further comprising:
a first resin that is inserted into a space formed inside the first loop section;
a second resin that is inserted into a space formed between the first loop section and the second loop section; and
an exterior resin that covers the antenna sheet.

11. The tag according to claim 9,
wherein a condenser coupling pattern of an interdigital shape is formed in the antenna pattern.

12. A method of manufacturing a tag, comprising:
forming an antenna pattern on a base material;
mounting an integrated circuit (IC) chip electrically connected with the antenna pattern on the base material;
forming a first loop by a first area that extends from both ends of a mounting section, on which the IC chip is mounted, that holds the IC chip therebetween;
intersecting at least parts of both ends of the first area with each other in an intersection portion that is formed on the base material and includes at least one slit extending from edge to inside of the base material to allow at least parts of both ends of the first area to intersect with each other; and
forming a second loop outside the first loop by a second area that extends from the intersected ends of the first loop.

* * * * *